(No Model.)

J. KING.
SKATE.

No. 403,052. Patented May 7, 1889.

WITNESSES:
Villette Anderson,
Mary Boykin

INVENTOR,
Joseph King,
BY
E. W. Anderson.
ATTORNEY.

UNITED STATES PATENT OFFICE.

JOSEPH KING, OF TROY, NEW YORK.

SKATE.

SPECIFICATION forming part of Letters Patent No. 403,052, dated May 7, 1889.

Application filed February 15, 1889. Serial No. 299,933. (No model.)

*To all whom it may concern:*

Be it known that I, JOSEPH KING, a citizen of the United States, and a resident of Troy, in the county of Rensselaer and State of New York, have invented certain new and useful Improvements in Skates and Runners; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 2:
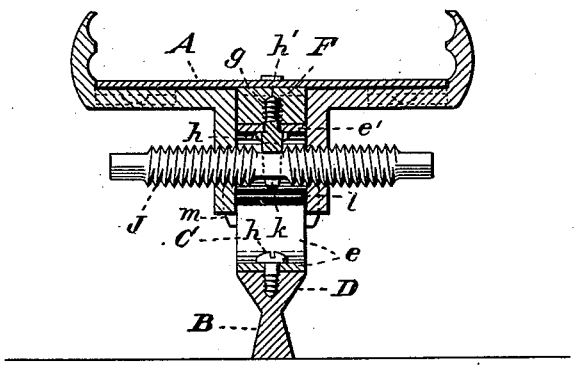
Figure 1:
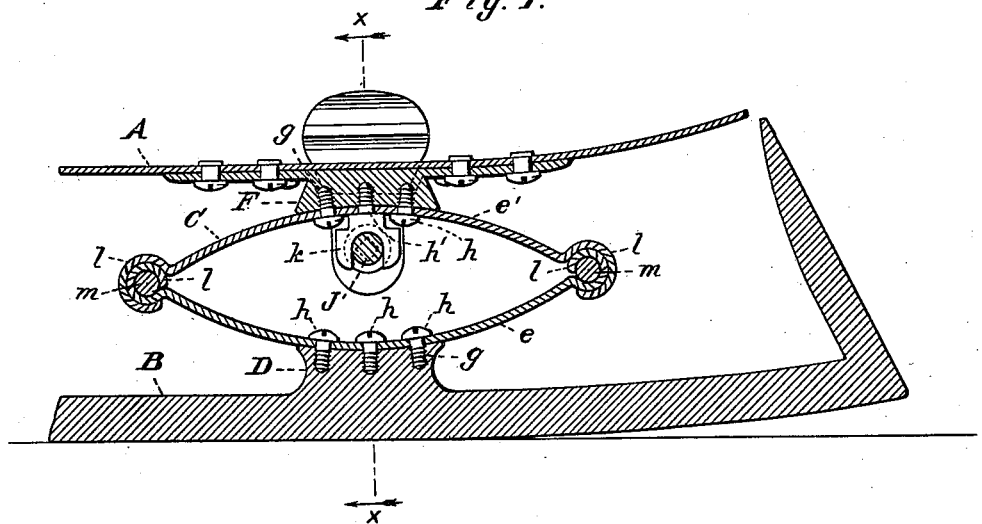
Figure 3:
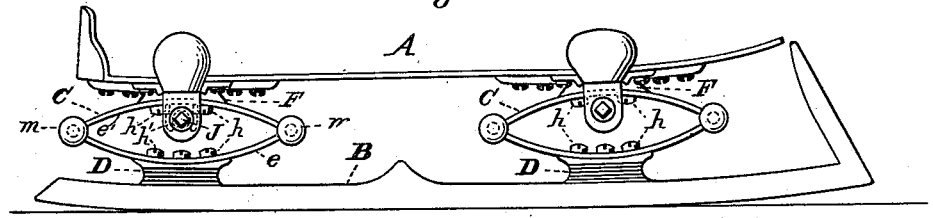

Figure 1 of the drawings is a representation of this invention, and is a longitudinal section through the forward portion of a skate. Fig. 2 is a cross-section taken where the broken line $x\,x$ is marked on Fig. 1. Fig. 3 is a side view of the skate.

This invention has relation mainly to skates; and it consists in the construction and novel combination of devices, all as hereinafter set forth, and pointed out in the appended claims.

In the accompanying drawings I have illustrated the invention in its application to a skate.

The letter A designates the body of the skate, and B the runner.

C C are elliptical springs, which are placed between the body and the runner in the plane of the latter, one spring being arranged under the rear portion and the other spring under the forward portion of the body.

The runner is formed with the bearings D on its upper edge, and each bearing is made longitudinally concave to receive the convexity of the lower branch, $e$, of the elliptic spring. A similar longitudinally-concave bearing, F, is provided on the under side of the body to receive the convexity of the upper branch, $e'$, of the spring. These bearings are provided with threaded sockets $g\,g'$ to receive the fastening-screws $h\,h'$, which pass through perforations in the spring branches; or rivets may be used. The middle screw, $h'$, is usually made with a forked head, $k$, to form a central bearing for the right and left clamping-screw J. The ends of the branches of the elliptic springs are cylindrical hooks $l$, which lap around the pin-bearings $m$, as indicated in the drawings.

Sleds and sleighs may be provided with similar longitudinally-concave bearings on the runner and body and with the elliptic springs secured to such bearings between said runner and body.

Having described this invention, what I claim, and desire to secure by Letters Patent, is—

1. The skate having its runner provided upon the upper surface with upwardly-extending or elevated concave-faced bearings, and its body provided upon the under side with downwardly-projecting concave-faced bearings, in combination with the elliptic springs arranged in the plane of the runners, and means for fastening the springs in place, substantially as set forth.

2. The skate having its runner provided with elevated concave-faced bearings and its body provided upon the under side with downwardly-extending or pendent concave-faced bearings, in combination with the elliptic springs, and screw fastening said springs upon said bearings, the upper leaves of said springs having their outer ends curved, and embracing corresponding bearings at the ends of the lower leaves, which bearings of the lower leaves receive the connecting-bolts of the leaves of the hinges, substantially as set forth.

In testimony whereof I affix my signature in presence of two witnesses.

JOSEPH KING.

Witnesses:
HENRY L. GREENE,
PATRICK GARVEY.